(12) United States Patent
Stratton

(10) Patent No.: US 7,284,438 B2
(45) Date of Patent: *Oct. 23, 2007

(54) METHOD AND SYSTEM OF PROVIDING POWER TO A PRESSURE AND TEMPERATURE SENSING ELEMENT

(75) Inventor: Thomas G. Stratton, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/272,306

(22) Filed: Nov. 10, 2005

(65) Prior Publication Data

US 2007/0113667 A1    May 24, 2007

(51) Int. Cl.
*G01L 9/00* (2006.01)
(52) U.S. Cl. .............................. 73/721; 73/725; 73/727; 73/719
(58) Field of Classification Search ................. 73/179, 73/384, 719, 721, 725, 727; 437/901
See application file for complete search history.

(56) References Cited

U.S. PATENT DOCUMENTS

| | | | | |
|---|---|---|---|---|
| 4,399,707 A | | 8/1983 | Wamstad ..................... | 727/73 |
| 4,539,843 A | * | 9/1985 | Wise ........................... | 73/179 |
| 6,065,346 A | | 5/2000 | Voegele ....................... | 754/73 |
| 6,510,742 B1 | | 1/2003 | Johnson ....................... | 754/73 |

* cited by examiner

*Primary Examiner*—Andre J. Allen

(57) ABSTRACT

A method and system of providing power to a pressure and temperature sensing element is provided. Polarity switching is added to a current source for a sensor, which includes one piezo-resistive sensing element configured as a single implant square located at an edge of a diaphragm of the element, and which produces pressure and temperature outputs. The piezo-sensing element operates as a piezo-resistive radial element when current is conducted through the element radially with respect to the diaphragm. Conversely, the piezo-sensing element operates as a piezo-resistive tangential element when current is conducted through the element tangentially to the edge of the diaphragm. A difference in the radial and tangential resistances is proportional to an applied pressure, while a sum of the resistances is a function of temperature. By alternating the polarity of power applied to the sensor, a build up of ions resulting from PUD is minimized.

20 Claims, 4 Drawing Sheets

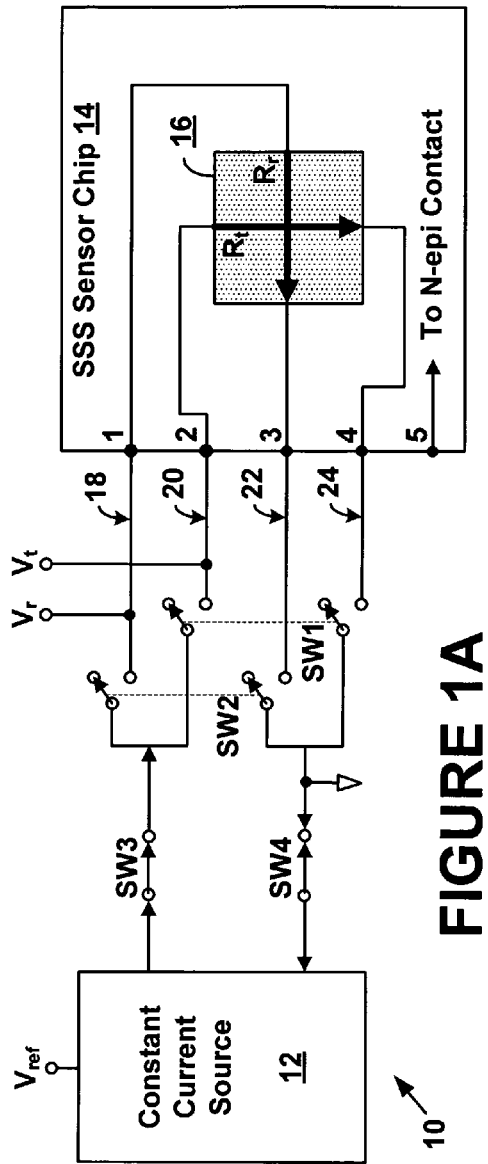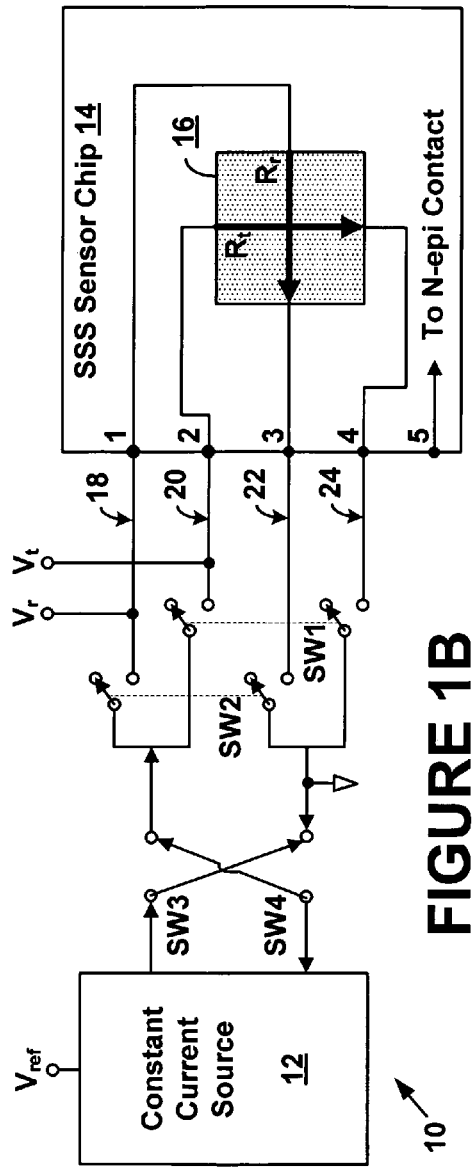

METHOD AND SYSTEM OF PROVIDING POWER TO A PRESSURE AND TEMPERATURE SENSING ELEMENT

FIELD OF INVENTION

The present invention relates generally to pressure and temperature sensors and, more particularly, to polarity switching within a common pressure and temperature sensing element.

BACKGROUND

A diaphragm type silicon based pressure sensor will typically include piezoresistors positioned to sense strain associated with pressure and arranged in a Wheatstone bridge to which a direct current voltage is applied. The output voltage of the bridge is representative of the pressure that is being sensed. When no pressure is sensed the output of the bridge should be zero or null. However, slight differences in the bridge resistors or other causes will typically produce some initial offset from null upon power up of the bridge. Thus, a power up drift (PUD) phenomena has been observed in silicon based sensors (that is not explained by a small thermal rise) that may occur after power is applied to the sensor.

The PUD phenomena is apparently a result of charges (e.g., mobiles ions) present in a silicon chip or on the surface of a silicon chip, which have one preferred configuration with power off and a second preferred configuration with power on. That is, the charges move in response to the application of voltage to the silicon chip. As the charges move they apparently affect the characteristics of the circuit elements on the chip. The charges may reside in any of a number of locations in the integrated circuit. The charges may be in the silicon, in insulating layers on or under the silicon, at the interfaces between two of these layers, or at the surface of the silicon chip, for example. For more information regarding PUD, the reader is referred to U.S. Pat. No. 6,065,346, the contents of which are herein incorporated by reference, as if fully set forth in this description.

In some pressure sensors, the charges from a PUD can be larger than the voltage output changes that are related to pressure readings. The PUD phenomena is typically of little consequence for digital circuitry as the change in charge location usually results in voltage changes that are much smaller than the rail voltages used. However in some circuitry, including pressure sensor circuitry, a bridge configuration is designed to minimize changes in power up voltages, and other performance limitations.

In a bridge configuration, the change of any one element resulting from redistribution of charges on power up may not be significant as long as the bridge's balancing element undergoes the same change. Therefore, care is usually taken in the design of a sensor to insure that the individual elements of the bridge are as identical as possible. As a result, the power-up drift of the bridge output "resets" itself after the power is removed to the value that existed before power was applied.

Within pressure sensors that employ a conventional full (4-arm) Wheatstone bridge mechanization, powered by a constant voltage source, a differential voltage output proportional to a pressure can be sensed. High performance sensors can also include an on-chip full Wheatstone temperature bridge. The temperature output can then be used to compensate and calibrate the pressure output using microprocessor-based electronics, for example. Thus, high performance sensors including both pressure and temperature Wheatstone bridge mechanisms include two separate configurations on the same chip.

However, full bridge mechanizations including pressure and temperature Wheatstone bridge mechanisms, can be susceptible to non-compensatable errors such as non-ratiometricity errors, power-up drift, thermal hysteresis, and time dependant high temperature induced drift (HTNR). These errors may be related to one or more of the following: a difference in voltage sensitivity of elements in a top of the Wheatstone bridge compared to those in the bottom of the Wheatstone bridge, migration of ionic contaminants in the presence or absence of an electrical field, and the magnitude of the sensor voltage source.

In addition, numerous applications for high performance sensors may require high accuracy in the sensor's outputs, and the constant voltage source of the sensor can cause charges from a PUD to alter the pressure sensor's voltage output resulting in unacceptable readings. Further, existing high performance sensors require complex configurations to enable both pressure and temperature sensing. Thus, a less complex sensor not susceptible to PUD effects is desirable.

SUMMARY

Within embodiments disclosed herein, a sensor is described that includes a single sensing element and a current source. The single sensing element has a tangential resistance when current flow is tangential to the sensing element and a radial resistance when current flow is radial to the sensing element. The current source provides power to the single sensing element. In particular, the current source provides power that has a positive polarity during a first measurement and a negative polarity during a second measurement. In this manner, the current source provides power to the single sensing element so as to reduce power up drift, for example.

The radial and tangential resistances of the single sensing element correspond to a measured pressure and temperature. In particular, a difference in the tangential resistance and the radial resistance is a measurement of pressure applied to the sensing element, and a sum of the tangential resistance and the radial resistance is a measurement of an ambient temperature of the sensing element. Thus, by changing a direction of current through the single square silicon element a tangential voltage across the tangential resistance and a radial voltage across the radial resistance can be measured to determine a magnitude of a pressure applied to the single square silicon element and to determine a magnitude of an ambient temperature of the single square silicon element.

These as well as other features and advantages will become apparent to those of ordinary skill in the art by reading the following detailed description, with appropriate reference to the accompanying drawings.

BRIEF DESCRIPTION OF FIGURES

FIG. 1 illustrates one embodiment of a voltage polarity switched single square sensor (SSS).

DETAILED DESCRIPTION

Figure 2:
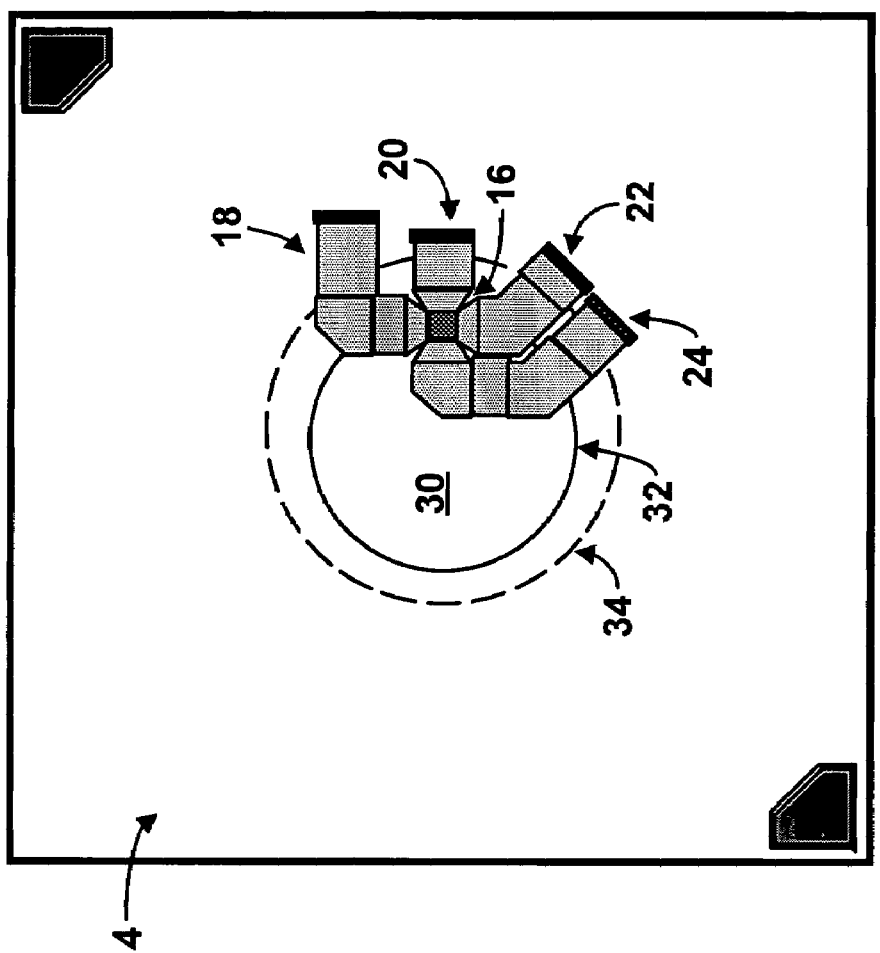
FIG. 2 illustrates one example of a magnified pictoral view of the SSS chip.

In an exemplary embodiment, instability issues related to pressure sensors that result from ionic diffusion in the presence of an electric field can be lessened or eliminated. For example, instability issues relating to PUD within pressure sensors can be reduced. In one instance, polarity switching is added to a power supply used within a single square sensor (SSS). By powering the sensor with the power supply polarity in one direction on one cycle of measurements and in a second direction on the next measurement cycle, a build up of ions resulting from PUD is minimized.

In the exemplary embodiment, polarity switching is implemented in the SSS, which includes one piezo-resistive pressure/temperature sensing element configured as a single light implant square located at an edge of a diaphragm of the element, and which may produce outputs relating to both a pressure and temperature that has been sensed. The piezo-sensing element may operate as a piezo-resistive radial element when a constant current is conducted through the element in the radial direction with respect to the diaphragm. Conversely, the piezo-sensing element may operate as a piezo-resistive tangential element when a constant current is conducted through the element in the tangential direction to the edge of the diaphragm. A difference in the radial and tangential resistances and a corresponding difference in voltage drop are proportional to an applied pressure, while a sum of the same two resistances is a function of temperature.

Thus, in one embodiment, a single piezo-resistive element may be operated as both a radial piezo-resistor (Rr) and as a tangential piezo-resistor (Rt), so that when operated with a constant current source, the difference in Rr and Rt is a measurement of pressure and the sum of Rr and Rt is a measurement of temperature. Further, by using polarity switching to control the power applied to the sensor, PUD can be minimized and the sensor may operate more effectively.

I. Single Square Sensor (SSS)

Referring now to the figures, and more particularly to FIG. 1, one embodiment of a voltage polarity switched single square sensor (SSS) 10 is illustrated. It should be understood that the SSS 10 in FIG. 1 and other arrangements described herein are set forth for purposes of example only, and other arrangements and elements can be used instead and some elements may be omitted altogether, depending on manufacturing preferences.

The sensing element 10 includes a constant current source 12 that drives a single square silicon (SSS) sensor chip 14. The constant current source 12 may provide a current of 1 ma, for example. Switches connect the current source 12 to the SSS chip 14. As shown, a first switch, SW1, connects the constant current source 12 to the SSS chip 14 at nodes 2 and 4. A second switch, SW2, connects the constant current source 12 to the SSS chip 14 at nodes 1 and 3. The switches SW1 and SW2 could be integrated on the SSS chip 14 itself. Node 5 is included on the sensing element 10 for biasing the element in a controlled manner, for example.

The SSS chip 14 may be a solid-state device. The SSS chip 14 includes a single square silicon (SSS) element 16, which senses both applied pressures and ambient temperatures. The SSS element 16 has two inputs: one input is a radial voltage input from lead 18 and the other input is a tangential input from lead 20. The SSS element 16 accordingly has two outputs: one output is a radial voltage output ($V_r$) at lead 22, and the other output is a tangential voltage output ($V_t$) at lead 24.

The sensing element 10 further includes switches SW3 and SW4 to control power supplied to the SSS sensor chip 14. The switches SW3 and SW4 may be controlled by the current source 12 or by an independent controller (not shown). In particular, when the switches are configured as shown in FIG. 1A, power with positive polarity (as seen by the sensor chip 14) is provided to the sensor chip 14. With the switches configured as shown in FIG. 1B, power with negative polarity (as seen by the sensor chip 14) is provided to the sensor chip 14. Thus, by changing the orientation of switched SW3 and SW4, the current source 12 can provide power that has alternating polarities to the sensor chip 14 (described more fully below).

The SSS chip 14 may also include a diaphragm (not shown) upon which the SSS element 16 is mounted. When a pressure is applied to the diaphragm, a lattice structure of the SSS chip becomes stressed and alters a mobility of charge carriers in the SSS element 16 temporarily changing a radial (e.g., strain in the direction from a center of the sensor toward the edge) and tangential (e.g., strain perpendicular to the radial strain) resistance of the SSS element 16. By measuring the radial voltage output ($V_r$) and the tangential voltage output ($V_t$), an applied pressure to the SSS chip 14 and an ambient temperature of the SSS chip 14 can be approximated.

FIG. 2 illustrates one example of a magnified pictoral view of the SSS chip 14. The (SSS) element 16 is illustrated mounted on a diaphragm 30. The diaphragm 30 includes an inner edge 32 and an outer edge 34. As shown, the (SSS) element 16 may be mounted on the inner edge 32 of the diaphragm. A maximum stress of the flexible membrane may occur on the inner edge 32 of the diaphragm 30, and thus, the (SSS) element 16 can be positioned to sense the maximum amount of stress, for example. Applied pressures to the diaphragm 30 will deflect a flexible membrane of the diaphragm 30, and these stresses in the membrane will change resistances of the (SSS) element 16. Such changes in resistance in the (SSS) element 16 will cause a change in output voltages of the (SSS) element 16 that are proportional to the applied pressures. For example, a small deflection in the flexible membrane of the diaphragm can be detected in a change in resistances within the (SSS) element 16.

A thickness and diameter of the diaphragm 30, e.g., an aspect ratio of diaphragm, can be selected to be give rise to a certain deflection, which is equivalent to a certain change in resistance. For example, a thick diaphragm may result in a small change in resistance on the (SSS) element 16 due to an applied pressure, and a thin diaphragm may result in a large change in resistance on the (SSS) element 16 from the applied pressure.

Voltage outputs from the sensing (SSS) element 16 correspond to a certain pressure and temperature reading. The exact correspondence depends on the aspect ratio of the diaphragm 30, and a size of circuit elements relative to a strain localization. Other factors can also affect the correspondence between voltages and pressure/temperature readings.

Furthermore, many different ranges of pressure can be measured using the (SSS) element 16. A specific limit depends on the material of the diaphragm 30 and on the aspect ratio (e.g., thickness of diaphragm), for example. A low range PSI full scale sensitivity could be sensed, as well as pressures up to about 20,000 PSI FSS, for example. For one specific example, the (SSS) element 16 may be used in a medium pressure application, such as measuring 500-3000 PSI and in high temperature applications.

Figure 3:
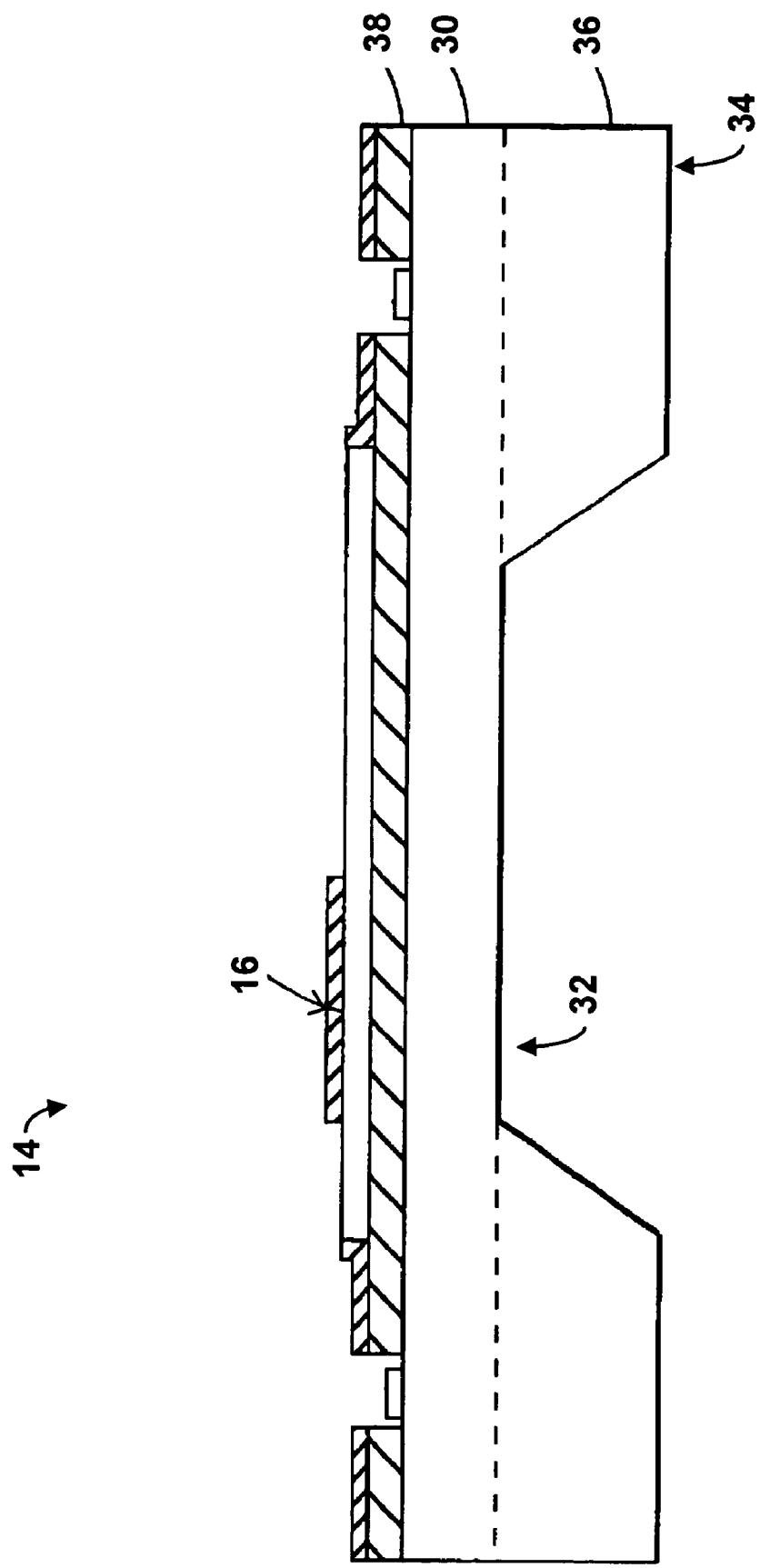
FIG. 3 illustrates a side view of one embodiment of the sensing element.

The SSS chip 14 may comprise a silicon-on-insulator structure or a bulk silicon structure, for example. FIG. 3 illustrates a side view of one embodiment of the SSS chip 14. The SSS chip 14 includes legs 36 for connecting the diaphragm 30 to any circuit or other substrate. Also, one or more of substrate layers (e.g., layer 38) may be deposited onto the diaphragm 30 onto which the (SSS) element 16 may be placed, for example. The (SSS) element 16 is positioned on an inner edge of the diaphragm 30 as shown.

For more information regarding the SSS, the reader is referred to U.S. application Ser. No. 11/271,701 to Russell Johnson entitled Pressure and Temperature Sensing Element), the contents of which are incorporated by reference, as is fully set forth in this description.

II. Single Square Sensor (SSS) Operation

Figure 4:
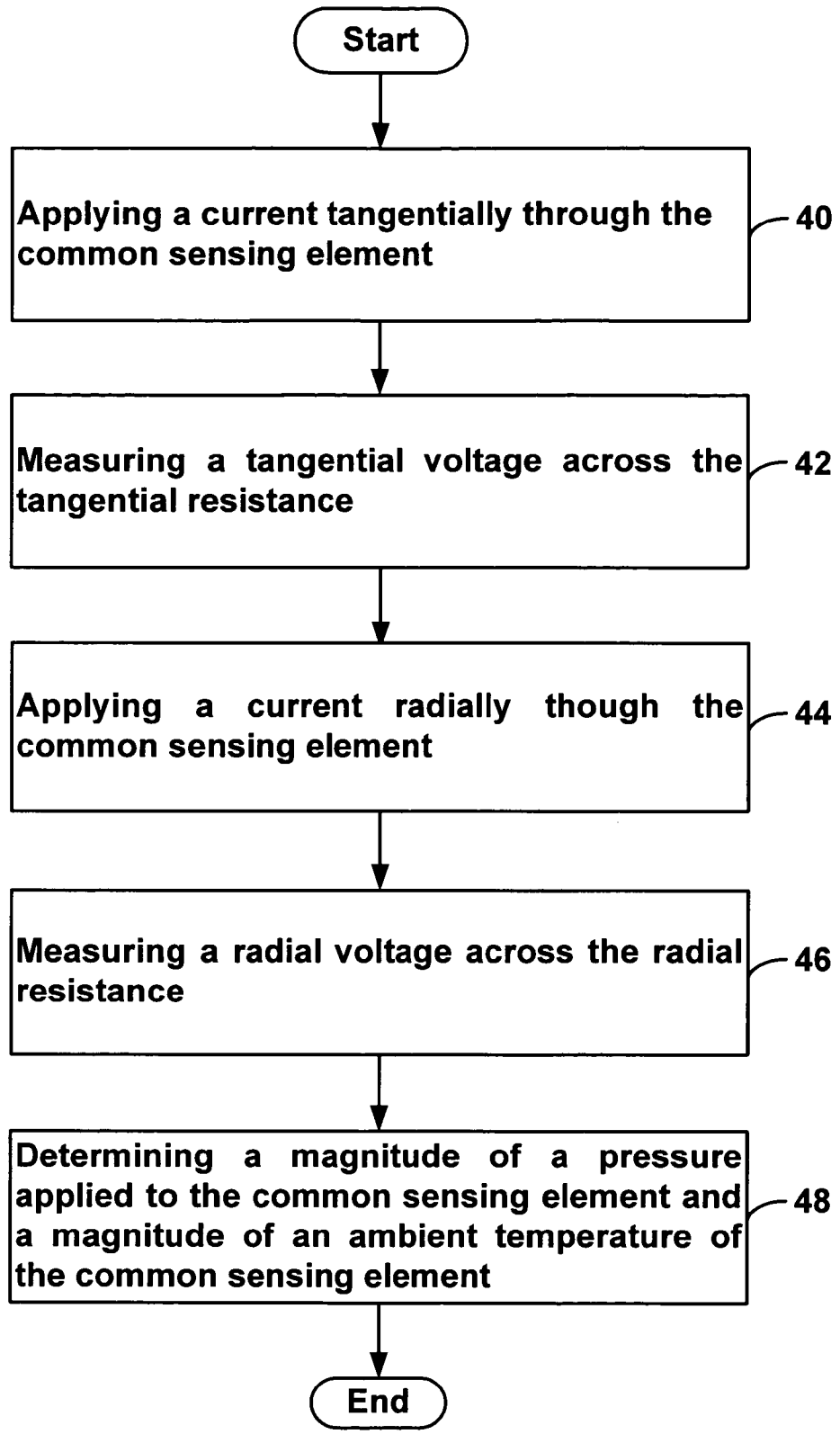
FIG. 4 is a flowchart depicting an example of functional blocks of a method for measuring pressure and temperature using a common sensing element.

FIG. 4 is a flowchart depicting an example of functional blocks of a method for measuring pressure and temperature using the (SSS) element 16 element, for example, as illustrated in FIG. 1. In such an example, the common sensing element has a tangential resistance when current flow is tangential to the common sensing element and a radial resistance when current flow is radial to the common sensing element. As shown at block 40, initially a current is applied tangentially through the common sensing element. A tangential voltage across the tangential resistance can then be measured, as shown at block 42. Next, as shown at block 44, a current is applied radially through the common sensing element. A radial voltage across the radial resistance can then be measured, as shown at block 46. Following, a magnitude of a pressure applied to the common sensing element and a magnitude of an ambient temperature of the common sensing element can be determined using the tangential voltage and the radial voltage, as shown at block 48. Of course, the order of the steps could also be 44, 46, 40, 42, for example.

In particular, referring to FIG. 1, when the SSS chip 14 is driven by the current source 12, outputs of the SSS chip 14 can be associated with a pressure or temperature as applied to the (SSS) element 16. Two resistances can be measured across the square silicon element 16. A resistance for the condition where current flow is tangential to the square 16 is defined as the tangential resistance $R_t$. This condition applies when SW1 is closed and SW2 is open. Conversely, a resistance for the condition where current flow is radial to the square 16 is defined as the radial resistance $R_r$. This condition applies when SW2 is closed and SW1 is open. Thus, a voltage $V_t$ at node 2 is found as follows:

$$V_t = \left(1 + \frac{dR_t}{R_t}\right) R_t I_{cc} \qquad \text{Eq. (1)}$$

where $I_{cc}$ is the current applied from the constant current source and $$\frac{dR_t}{R_t}$$

is the tangential piezoresistive gage factor (e.g., constant value that relates a radial strain or defamation of the surface to the change in resistance and is dependent upon the properties of the materials of the sensor). A voltage $V_r$ at node 1 is similarly found as follows:

$$V_r = \left(1 - \frac{dR_r}{R_r}\right) R_r I_{cc} \qquad \text{Eq. (2)}$$

where $$\frac{dR_r}{R_r}$$

is the radial piezoresistive gage factor.

For conditions of $R_t = R_r = R_o$, and $$\left|\frac{dR_t}{R_t}\right| = \left|\frac{dR_r}{R_r}\right| = \left|\frac{dR_o}{R_o}\right|,$$

then the differential voltage dV proportional to pressure is the difference of $V_t$ and $V_r$ as follows:

$$dV = (V_t - V_r) = 2\left(\frac{dR}{R_o}\right)(R_o I_{cc}) = 2\left(\frac{dR}{R_o}\right)(V_{cm}) \qquad \text{Eq. (3)}$$

where $(R_o I_{cc}) = V_{cm}$ is the common mode voltage drop across the SSS chip 14 for both the tangential and radial operating modes at pressure=0 conditions. As one example, for $R_o=2.5$ k ohm and $I_{cc}=1$ ma, $V_{cm}=2.5$ volts. Thus, an applied pressure to the SSS chip 14 is proportional to the difference between the tangential and radial voltage measured across the SSS element 16.

Note that if $V_{cm}$ is designed to be half of the $V_{ref}$ voltage of the current source 12, Eq. (3) then becomes:

$$dV = \left(\frac{dR}{R_o}\right) V_{ref} \qquad \text{Eq. (4)}$$

Equation (4) is that of a full Wheatstone bridge pressure sensor configuration operating with a constant voltage source of $V_{ref}$. Thus, the sensing element can provide the same pressure voltage output as that of full Wheatstone bridge sensors, but accomplishes such with a single piezoresistive element rather than four, for example.

In addition, outputs of the SSS chip 14 can also be associated with an ambient temperature of the sensing element 10. A temperature signal designated as VT is defined as the sum of $V_t$ and $V_r$, which are defined in Equations (1) and (2) above. Therefore, VT is defined as follows:

$$VT = (V_t + V_r) = \left(\left(1 + \frac{dR_t}{R_t}\right) R_t I_{cc}\right) + \left(\left(1 - \frac{dR_r}{R_r}\right) R_r I_{cc}\right) \qquad \text{Eq. (5)}$$

For $|dR_r|=|dR_t|$, then VT(T) becomes:

$$VT(T) = [R_r(T) + R_t(T)] I_{cc} \qquad \text{Eq. (6)}$$

and VT is then independent of pressure. Thus, an ambient temperature of the SSS chip 14 is proportional to the sum of the tangential and radial voltage measured across the SSS element 16.

Thus, using the same common sensing element, e.g., the SSS element 16, to measure both pressure and temperature lessens or eliminates any temperature gradient between the pressure and temperature signal since the same measurements of the same element are used for both. For example, compensations of pressure measurements using the temperature measurements may be more accurate since the pressure and temperature measurements originate from the same sensing element.

To reduce a power-up-drift phenomena within the sensing element 10, a power polarity switching technique can be applied to the current source 12. For example, the current source 12 provides power in a radial and tangential direction. Further, the current source 12 could be arranged to provide power having a positive and negative polarity. The current source 12 could then apply power to the the (SSS) element 16 in a radial direction having a positive polarity, then in the radial direction having a negative polarity, and same for the tangential direction.

Table 1 below describes one timing cycle that may be used.

TABLE 1

| SW1 | SW2 | SW3 | SW4 | Sensor Measurement |
|---|---|---|---|---|
| Open | Closed | + | + | Radial Positive |
| Open | Closed | − | − | Radial Negative |
| Closed | Open | + | + | Tangential Positive |
| Closed | Open | − | − | Tangential Negative |

As shown, when SW1 is open and SW2 is closed, power is provided in the radial direction, and when SW1 is closed and SW2 is open, power is provided in the tangential direction. Thus, by changing the polarity using SW3 and SW4, the PUD can be reduced.

The power can be applied in substantially equal amounts of time for each polarity so that overall, the polarity changes will cancel out by providing power to the the (SSS) element 16 over the four combinations of switches.

Measurements can be taken at any points, for example, by recording individual radial positive measurements, and radial negative measurements, and averaging each, respectively. Alternatively, a running average of the last ten measurements, for example, can continually be calculated. Other examples are possible as well.

The current source 12 may include a controller for controlling the switching. The controller can be a microprocessor suitably programmed to use an algorithm to periodically close the switches, provide a period of time for outputs to stabilize, obtain a reading and provide a signal at an output which is representative of the pressure/temperature being sensed, open switch for a second period of time, and then repeat this sequence to provide updated measurements as desired.

For more information regarding SOI structures and reducing power up drift, the reader is referred to U.S. Pat. No. 6,510,742, the entire contents of which are incorporated by reference herein, as if fully set forth in this description.

III. CONCLUSION

The SSS sensor described within many embodiments herein can be used to reduce a complexity of typical Wheatstone bridge sensors, to increase pressure sensitivity and reduce on-chip voltage, which reduces average power usage, and to reduce thermal gradients between pressure and temperature measurements, for example.

Further, using the polarity switching technique to power the SSS, the electric fields within the SSS will be reversed so that a net drift of mobile ions over time within the sensor is negligible. In this manner, outputs of the SSS may be more accurate, for example, since any effects mobile ions have upon sensor output voltages will be essentially removed due to the net effect of any ion drift. Thus, the sensor may be used for applications that require the sensor to meet specifications within a very short time, (for example, a few seconds or less,) after power is applied since the power-up-drift phenomena within the SSS may be reduced.

The present application has been described with reference to silicon as the semiconductor material for the SSS. However, it should be understood that the present application is not limited to silicon, but applies to other semiconductor materials as well. In addition, a pressure and temperature sensor was used as an example to explain the present application; however the present application applies as well to other types of sensors.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A sensor comprising:
 a single sensing element having a tangential resistance when current flow is tangential to the sensing element and a radial resistance when current flow is radial to the sensing element; and
 a current source providing power to the single sensing element, the power having a positive polarity during a first measurement and having a negative polarity during a second measurement.

2. The sensor of claim 1, wherein a difference in a tangential voltage across the tangential resistance and a radial voltage across the radial resistance is relative to a measurement of pressure applied to the sensing element, and a sum of the tangential voltage and the radial voltage is relative to a measurement of an ambient temperature of the sensing element.

3. The sensor of claim 1, further comprising switches to control the power provided by the current source, wherein the switches are in a first position to provide power having the positive polarity to the single sensing element, and wherein the switches are in a second position to provide the power having the negative polarity to the single sensing element.

4. The sensor of claim 1, wherein the current source provides power to the single sensing element in a manner so as to reduce power up drift.

5. A sensing element comprising:
 a single square silicon element having a tangential resistance when current flow is tangential to the single square silicon element and a radial resistance when current flow is radial to the single square silicon element; and a current source providing power to the single square silicon element having a positive polarity during a first measurement and having a negative polarity during a second measurement, wherein by changing a direction of current through the single square silicon element a tangential voltage across the tangential resistance and a radial voltage across the radial resistance can be measured to determine a magnitude of a pressure applied to the single square silicon element and to determine a magnitude of an ambient temperature of the single square silicon element.

6. The sensing element of claim 5, farther comprising switches to control the current source, wherein the switches are in a first position to provide power having the positive polarity to the single square silicon element, and wherein the switches are in a second position to provide the power having the negative polarity to the single square silicon element.

7. The sensing element of claim 5, wherein by powering the single square silicon with power having the positive polarity during the first measurement and having the negative polarity during the second measurement, power up drift is minimized.

8. The sensing element of claim 5, wherein the magnitude of the pressure applied to the single square silicon element is proportional to a difference between the tangential voltage and the radial voltage.

9. The sensing element of claim 5, wherein the magnitude of the pressure applied to the single square silicon element is proportional to a differential voltage dV as follows:

$$dV = (V_t - V_r) = 2\left(\frac{dR}{R_o}\right)(V_{cm}),$$

where $V_t$ is the tangential voltage, $V_r$ is the radial voltage, $$\frac{dR}{R_o}$$

is a tangential piezoresistive gage factor, and $V_{cm}$ is the common mode voltage drop across the single square silicon element for tangential and radial operating modes at null pressure conditions.

10. The sensing element of claim 5, wherein the magnitude of the ambient temperature of the single square silicon element is proportional to a sum of the tangential voltage and the radial voltage.

11. The sensing element of claim 5, wherein the magnitude of the pressure applied to the single square silicon element is proportional to a differential voltage dV as follows:

$$VT = (V_t + V_r) = \left(\left(1 + \frac{dR_t}{R_t}\right)R_t I_{cc}\right) + \left(\left(1 - \frac{dR_r}{R_r}\right)R_r I_{cc}\right),$$

where $V_t$ is the tangential voltage, $V_r$ is the radial voltage, $$\frac{dR_t}{R_t}$$

is a tangential piezoresistive gage factor, $$\frac{dR_r}{R_r}$$

is a radial piezoresistive gage factor, $R_r$ is the radial resistance, $R_t$ is the tangential resistance, and $I_{cc}$ is current applied from the current source.

12. A method of reducing power up drift comprising:
providing a common sensing element, the common sensing element having a tangential resistance when current flow is tangential to the common sensing element, the common sensing element farther having a radial resistance when current flow is radial to the common sensing element;
providing power having a positive polarity to the common sensing element during a first measurement; and
providing power having a negative polarity to the common sensing element during a second measurement.

13. The method of claim 12, wherein the first measurement records a tangential voltage across the tangential resistance and the second measurement records the tangential voltage across the tangential resistance.

14. The method of claim 12, wherein the first measurement records a radial voltage across the radial resistance and the second measurement records the radial voltage across the radial resistance.

15. The method of claim 12, further comprising acquiring one or more measurements while providing power having the positive polarity and acquiring one or more measurements while providing power having the negative polarity.

16. The method of claim 15, further comprising averaging the one or more measurements recorded while providing power having the positive polarity and averaging the one or more measurements recorded while providing power having the negative polarity.

17. The method of claim 12, wherein providing power having the positive polarity to the common sensing element during the first measurement, and providing power having the negative polarity to the common sensing element during the second measurement comprises providing power to the common sensing element in a manner so as to reduce power up drift.

18. A method of making a pressure and a temperature measurement comprising:
providing a common sensing element having a tangential resistance when current flow is tangential to the common sensing element and a radial resistance when current flow is radial to the common sensing element;
providing current having a positive polarity tangentially to the common sensing element;
making a first measurement of a tangential voltage across the tangential resistance;
providing current having a negative polarity tangentially to the common sensing element;
making a second measurement of a tangential voltage across the tangential resistance;
providing current having a positive polarity radially to the common sensing element; and making a first measurement of a radial voltage across the radial resistance; and providing current having a negative polarity radially to the common sensing element;

making a second measurement of a radial voltage across the radial resistance;

determining a magnitude of a pressure applied to the common sensing element and a magnitude of an ambient temperature of the common sensing element using the tangential voltage and the radial voltage; and storing the magnitude of the pressure applied to the common sensing element and the magnitude of the ambient temperature of the common sensing element.

19. The method of claim 18, wherein determining the magnitude of the pressure applied to the common sensing element comprises:

averaging the first measurement of the tangential voltage across the tangential resistance and a negative value of the second measurement of the tangential voltage across the tangential resistance;

averaging the first measurement of the radial voltage across the radial resistance and a negative value of the second measurement of the radial voltage across the radial resistance; and determining a difference between the averaged tangential voltage and the averaged radial voltage.

20. The method of claim 18, wherein determining the magnitude of the ambient temperature applied to the common sensing element comprises averaging the first measurement of the tangential voltage across the tangential resistance and a negative value of the second measurement of the tangential voltage across the tangential resistance;

averaging the first measurement of the radial voltage across the radial resistance and a negative value of the second measurement of the radial voltage across the radial resistance; and determining a sum of the averaged tangential voltage and the averaged radial voltage.

* * * * *

UNITED STATES PATENT AND TRADEMARK OFFICE
CERTIFICATE OF CORRECTION

PATENT NO. : 7,284,438 B2  
APPLICATION NO. : 11/272306  
DATED : October 23, 2007  
INVENTOR(S) : Thomas G. Stratton It is certified that error appears in the above-identified patent and that said Letters Patent is hereby corrected as shown below:

Col. 10 in Claim 12, line 5 the word "farther" should be --further--

Signed and Sealed this

Second Day of September, 2008

JON W. DUDAS  
*Director of the United States Patent and Trademark Office*